(12) United States Patent
Nakazawa et al.

(10) Patent No.: US 9,557,592 B2
(45) Date of Patent: Jan. 31, 2017

(54) DISPLAY DEVICE HAVING A DISPLAY PANEL

(71) Applicant: CANON KABUSHIKI KAISHA, Tokyo (JP)

(72) Inventors: Tomonori Nakazawa, Odawara (JP); Masashi Morishita, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 14/603,945

(22) Filed: Jan. 23, 2015

(65) Prior Publication Data

US 2015/0212363 A1     Jul. 30, 2015

(30) Foreign Application Priority Data

Jan. 27, 2014   (JP) ................................. 2014-012434

(51) Int. Cl.
    *G02F 1/1333*     (2006.01)

(52) U.S. Cl.
    CPC .................. *G02F 1/133308* (2013.01); *G02F 2001/133317* (2013.01); *G02F 2201/54* (2013.01)

(58) Field of Classification Search
    CPC .................................................. G02F 1/133308
    See application file for complete search history.

(56) References Cited

FOREIGN PATENT DOCUMENTS

JP          2010-204357 A        9/2010

*Primary Examiner* — Joseph L Williams
(74) *Attorney, Agent, or Firm* — Cowan, Liebowitz & Latman, P.C.

(57) ABSTRACT

Provided is a display device including: a display panel; a support member that is in contact with at least a part of a lower side of the display panel; and a panel holder that has a first member supporting via the support member the lower side of the display panel. The support member is an elastic body that, in a case where the display panel is deformed, deforms accordingly as a result of a part thereof moving relative to the first member.

14 Claims, 17 Drawing Sheets

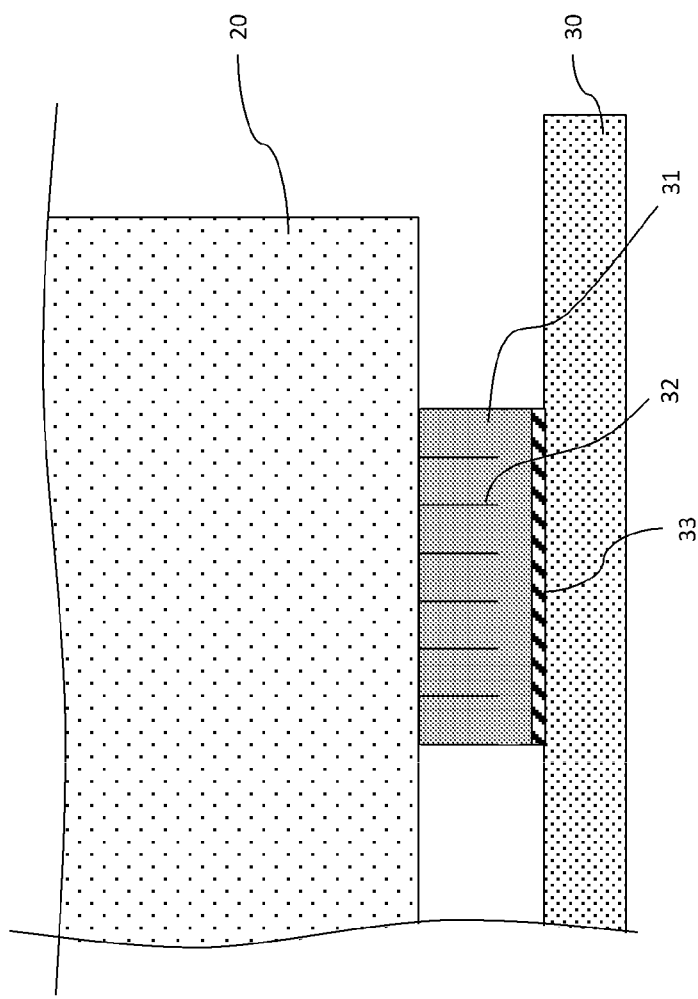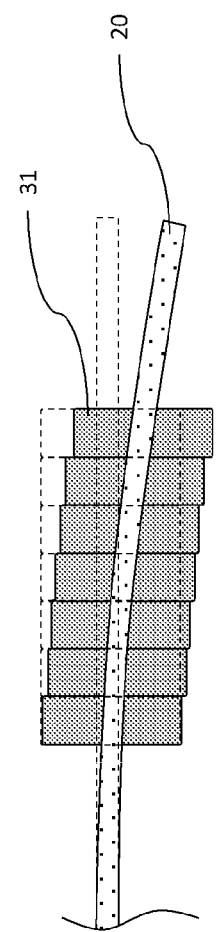

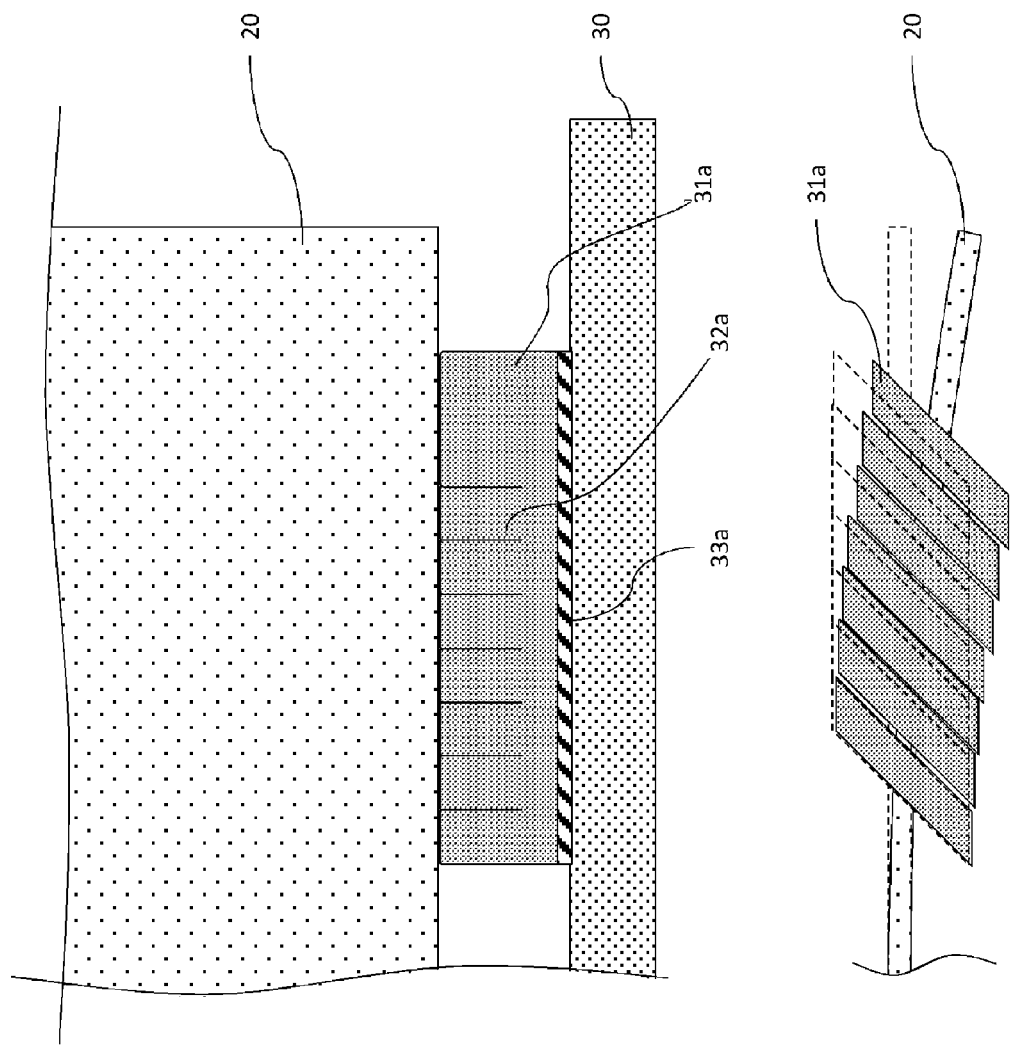

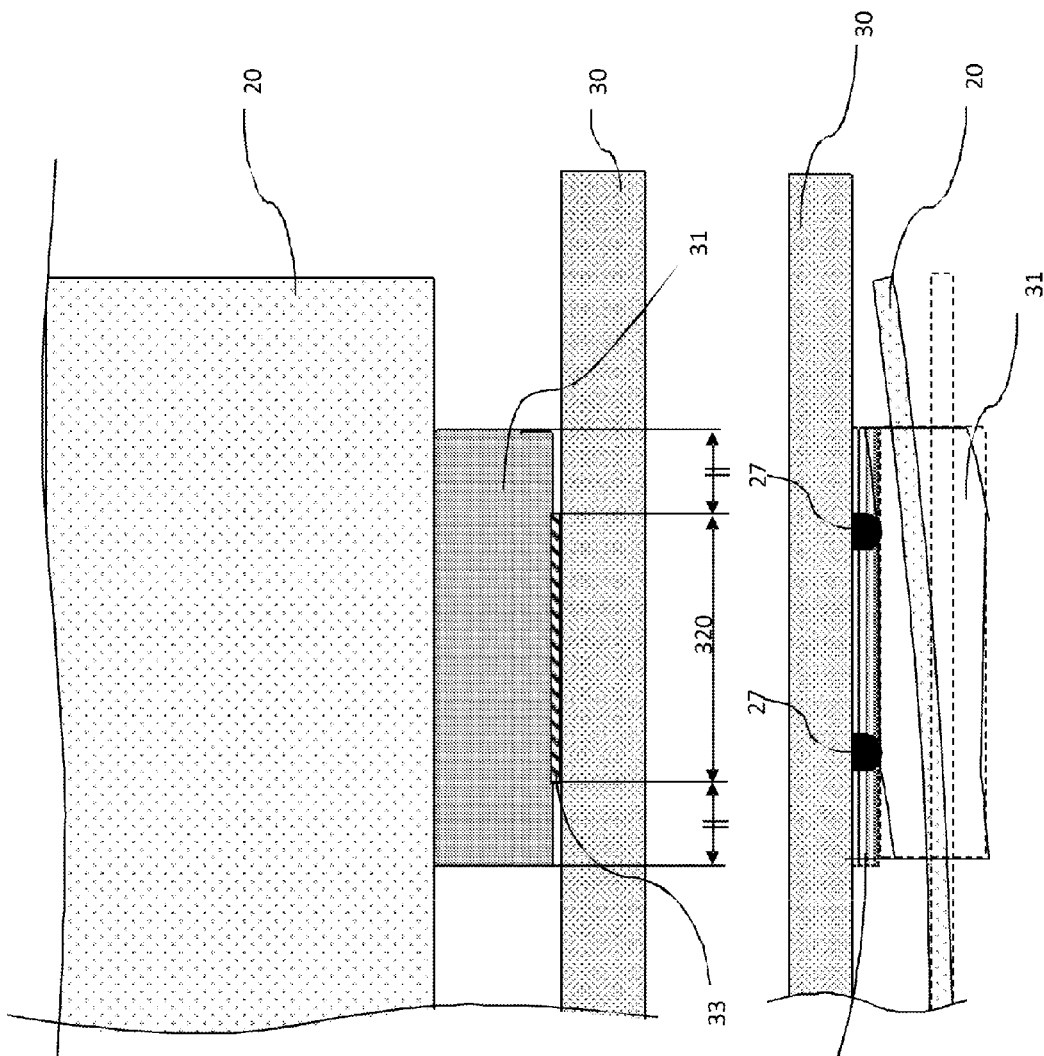

DISPLAY DEVICE HAVING A DISPLAY PANEL

BACKGROUND OF THE INVENTION

Field of the Invention

The present invention relates to a display device.

Description of the Related Art

A display panel such as a liquid crystal panel and an organic electroluminescence (EL) panel is provided with display elements such as liquid crystals or organic light-emitting elements between two glass substrates on which thin-film devices have been formed.

An image display device equipped with the display panel is configured such that a metal case in which the display panel is accommodated or to which it is adhesively bonded is disposed on a side opposite that of the display surface, and the display surface side is covered with a metal frame.

An image display device in which a display panel is a liquid crystal panel is provided with the liquid crystal panel, a backlight irradiating the liquid crystal panel, and an optical sheet condensing the light from the backlight. Those members are disposed in the order of the optical sheet and the backlight at the back surface side of the liquid crystal panel. A panel holder made from a resin is disposed such as to cover the circumference of the liquid crystal panel and the back surface on the outside of the display region with the object of maintaining a constant space between the liquid crystal panel and the optical sheet and also to hold the liquid crystal panel itself. Further, a metal frame is disposed on the front surface side of the liquid crystal panel. The liquid crystal panel is sandwiched between the panel holder and the frame, with elastic bodies such as cushions being interposed therebetween.

The structure of an image display device will be explained hereinbelow using FIG. 16 that depicts an image display device provided with a liquid crystal panel.

When a display panel 20 is a liquid crystal panel, the display panel is constituted by glass substrates having thin-film devices formed thereon, such as a color filter substrate 20a and a TFT substrate 20b. The display panel 20 is obtained by cutting a large mother glass substrate in a state in which those substrates are sealed. Since the cutting is performed by scribing and breaking by using a diamond cutter, a burr 20c appears on the end surface of the glass substrate. Since the display device such as an organic EL is also configured of a glass substrate, the following phenomenon can occur.

When the image display device is disposed vertically, the lower end of the display panel 20 comes into contact with a panel support section 30a that supports the lower end of the display panel 20 in the panel holder 30. In this case, the lower end of the display panel 20 is sometimes caught by the panel support section 30a under the effect of the weight of the display panel 20 and the burr 20c. The display panel 20 can move on the panel holder 30 for various reasons such as impacts and outer forces occurring when the image display panel is transported. Where the display panel 20 moves, the positional relationship with the cushion changes, a local force can be applied to the display panel 20, the display panel 20 can be deformed, and local stresses can be generated therein. When the aforementioned catching occurs, the display panel 20 that has moved sometimes cannot return to the original position preceding the movement because the display panel has been caught, and the display panel 20 remains in the deformed state. Further, with certain methods for processing the display panel 20, a high friction coefficient can be realized between the end surface of the display panel 20 and the panel support section 30a, even when the burr is not present, and the friction can result in catching. The stresses caused by the catching cannot be removed unless the catching is eliminated.

In a liquid crystal panel, the stresses disturb the orientation of liquid crystals and the application of voltage cannot be accurately controlled. As a result, brightness uniformity and chromaticity uniformity of the displayed image locally decreases at a location where the stresses have appeared in the display panel 20. Such lack of uniformity is called "display unevenness". The display unevenness can occur close to the panel support section 30a because the burr 20c of the display panel 20 is caught by the panel support section 30a, as mentioned hereinabove. The display unevenness also occurs at other positions when stresses are locally concentrated. A structure that temporarily reduces the stresses applied to the display panel has been suggested to avoid the above-described problems (Japanese Patent Application Publication No. 2010-204357).

SUMMARY OF THE INVENTION

A certain displacement of the display panel 20 can occur under usage conditions, for example, when vibrations or external forces act upon the display panel 20 when the panel is handled. Further, the display panel 20 can be warped at the four corners thereof when the usage environment of the display panel 20, for example, the ambient temperature and humidity, changes. The warping is due to the properties of polarizers attached to the front surface and back surface of the display panel 20. Thus, the display panel 20 is warped because of a difference in expansion coefficient or contraction coefficient, or a difference in expansion and contraction directions between the polarizers on the front surface and back surface. Due to such movement or warping of the display panel, even when the catching is canceled, the display panel can still be caught anew by the panel support section 30a. The problem is also that even slight catching further facilitates stress concentration in the display panel 20, thereby causing the display unevenness.

In accordance with the present invention, stresses occurring in the display panel when the display panel of an image display device is displaced or warped are relaxed and the display unevenness is reduced.

The present invention provides a display device including:
 a display panel;
 a support member that is in contact with at least a part of a lower side of the display panel; and
 a panel holder that has a first member supporting via the support member the lower side of the display panel, wherein
 the support member is an elastic body that, in a case where the display panel is deformed, deforms accordingly as a result of a part thereof moving relative to the first member.

In accordance with the present invention, stresses occurring in the display panel when the display panel of an image display device is displaced or warped can be relaxed and the display unevenness can be reduced.

Further features of the present invention will become apparent from the following description of exemplary embodiments with reference to the attached drawings.

BRIEF DESCRIPTION OF THE DRAWINGS

FIGS. 5A and 5B illustrate a state in which the panel holding member of Embodiment 1 follows the warping of the display panel;

FIGS. 6A and 6B depict an example of shape variation of the panel holding member of Embodiment 1;

FIGS. 13A and 13B are perspective views of a backlight in a state in which the display panel of Embodiment 4 is warped;

DESCRIPTION OF THE EMBODIMENTS

Embodiment 1

Embodiment 1 of the present invention will be explained hereinbelow with reference to the drawings.

Figure 1:
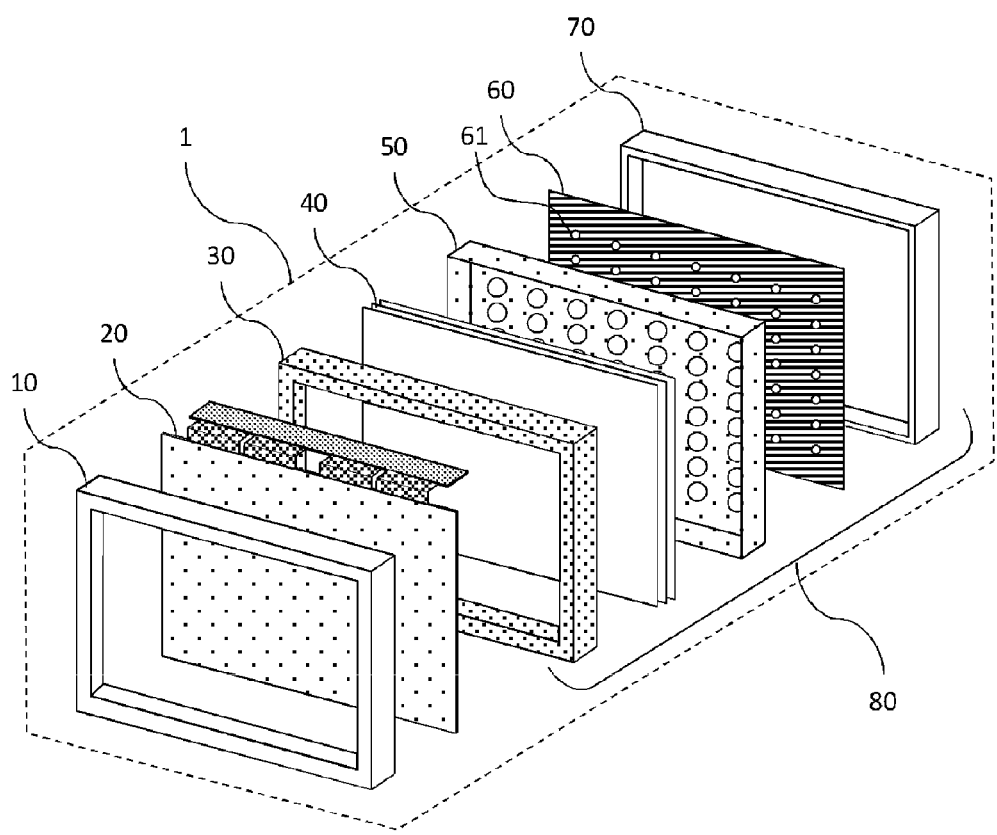
FIG. 1 is a partial perspective view illustrating schematically the image display device of Embodiment 1.

FIG. 1 is a partial perspective view illustrating schematically the image display device of Embodiment 1.

The image display device 1 is constituted by a frame 10, a display panel 20, a panel holder 30, an optical sheet 40, a reflecting sheet 50, a substrate 60, and a case 70. The frame 10 is most often made from a metal and formed by pressing and machining, but may be also molded from a resin. The panel holder 30 is preferably molded from a resin, but may be also formed from a metal material. The panel holder 30 holds and accommodates the display panel 20 so as to maintain a constant space between the display panel and the optical sheet 40.

The optical sheet 40 is constituted by a plurality of sheets and disposed between a light source 61 and a display panel 20.

The optical sheet 40 diffuses or condenses light from the light source 61 when the light is transmitted therethrough.

The reflecting sheet 50 reflects the light from the light source 61 toward the display panel 20.

The light source 61 such as a light emitting diode (LED) or a cold cathode fluorescent lamp (CCFL) is mounted on the substrate 60. There are backlight systems of a directly-below type or an edge-light type, and the configuration of the present invention can be used wither either of them.

The case 70 houses the optical sheet 40, the reflecting sheet 50, and the substrate 60. A backlight unit 80 is configured of the panel holder 30, the optical sheet 40, the reflecting sheet 50, the substrate 60, and the case 70, and the display panel 20 is irradiated by the backlight unit 80 from the back surface.

Figure 2:
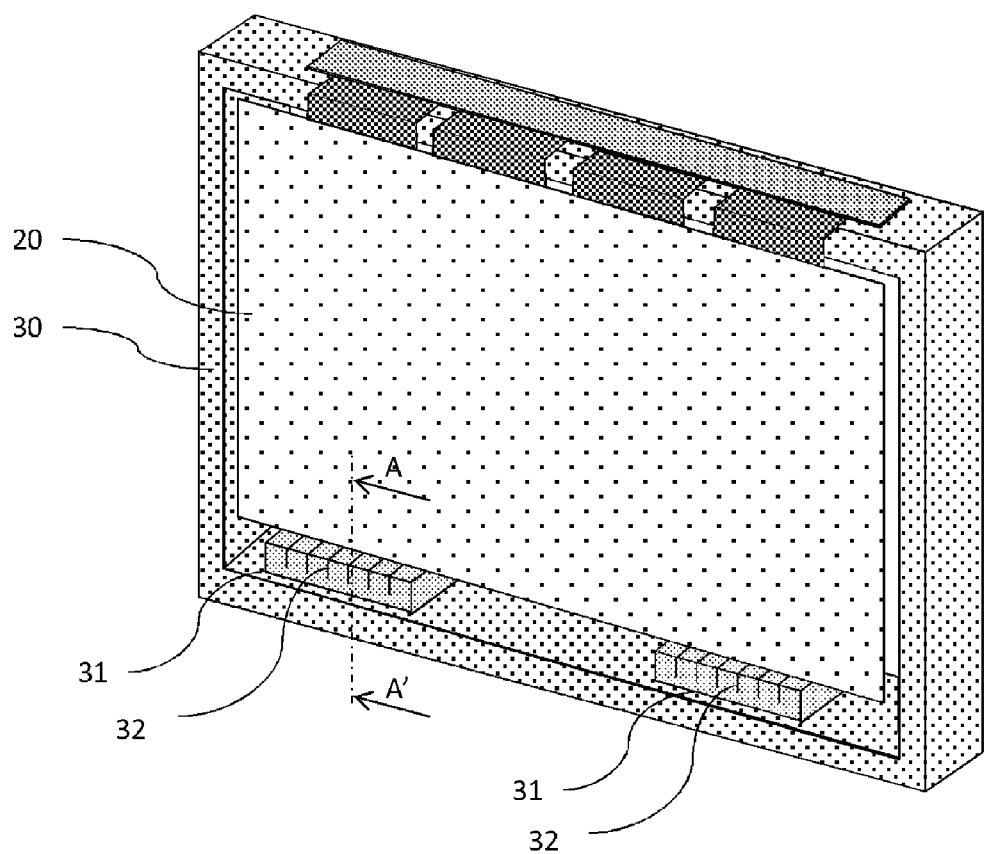
FIG. 2 illustrates a state in which the display panel of Embodiment 1 is incorporated in a backlight unit.
Figure 3:
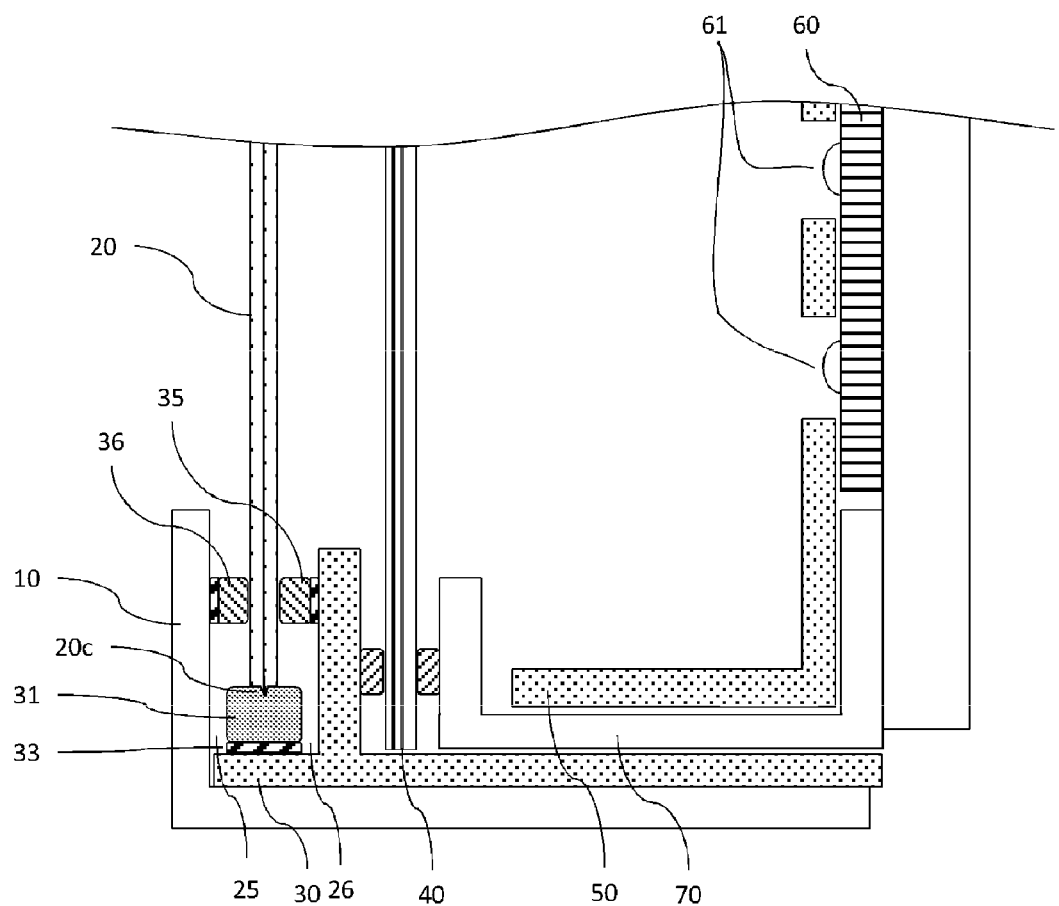
FIG. 3 illustrates a state in which the display panel of Embodiment 1 is incorporated in a backlight unit.

FIG. 2 is a perspective view illustrating schematically a state in which the display panel of Embodiment 1 of the present invention is incorporated in a backlight unit. In FIG. 2, the frame 10 is omitted. FIG. 3 is a cross-sectional view taken along the A-A' line in FIG. 2.

As depicted in FIGS. 2 and 3, the display panel 20 is held by a panel support member 31, a back-surface elastic body 35, and a front-surface elastic body 36.

The panel support member 31 is in contact with the lower end portion (lower side) of the display panel 20 and is disposed at positions such as to support the display panel. The lower side of the display panel 20 is thus supported at two locations.

The surface of the panel support member 31 on the side opposite that in contact with the display panel 20 is fixed by the panel holder 30 (first member). A two-side tape 33 is used for fixing.

The panel support member 31 is an elastic member constituted by using an elastic body such as a rubber or a urethane foamed body. Typically, when an elastic body such as a rubber or a urethane foamed body is compressed, compressive residual strains are generated. The modulus of elasticity, thickness, and length of the panel support member 31 are determined such that the display panel 20 is not displaced significantly with respect to the image display device 1 even when compressive residual stresses are generated in the panel support member 31 under the weight of the display panel 20. The thickness is the dimension in the direction of supporting the weight of the display panel 20, and the length is the dimension in the direction of warping at the lower side of the display panel 20. The width (dimension in the thickness direction of the display panel 20) of the panel support member 31 is determined such that the display panel 20 could not fall out of the panel support member 31. Thus, a front surface space 25 to be ensured between the frame 10 and the panel support member 31, and a back surface space 26 to be ensured between the panel holder 30 and the panel support member 31 are determined such as to be less than the thickness of the display panel 20. The panel support member 31 can be made from a material with a modulus of elasticity lower than that of the panel holder 30.

The panel support member 31 is provided with a plurality of notches 32. The notches 32 are provided in the direction perpendicular to the surface of the panel support member 31 supporting the display panel 20 and also in the direction perpendicular to the display surface of the display panel 20.

A gap between the panel holder 30 and the frame 10 where the display panel 20 is accommodated is larger than the warping amount of the display panel 20. As mentioned hereinabove, the warping amount of the display panel 20 varies depending on the temperature of the display panel and ambient humidity. Therefore, the gap between the frame 10 and the panel holder 30 is set by assuming the most warped state of the display panel 20 within the supposed temperature and humidity ranges of the display panel 20. As a result, even when the display panel 20 is warped, the inhibition of warping caused by contact with the frame 10 and panel holder 30 can be avoided, and the occurrence of stresses in the display panel 20 caused by the inhibition of warping can be suppressed.

The back-surface elastic body 35 is disposed at the rear surface side (back surface side) of the display panel 20 and fixed to the panel holder 30 (third member). The front-surface elastic body 36 is disposed at the display surface side of the display panel 20 and fixed to the frame 10 (second member). An elastic body such as a rubber foamed body or a urethane foamed body is used as a material of the back-surface elastic body 35 and the front-surface elastic body 36. Where the display panel 20 is warped, either back-surface elastic body 35 or the front-surface elastic body 36 is compressed, depending on the warping direction. The modulus of elasticity, width, length (dimension in the direction along the surface of the display panel 20), and thickness (dimension in the thickness direction of the display panel 20) of the back-surface elastic body 35 and the front-surface elastic body 36 are determined such that no stresses causing the display unevenness appear in the display panel 20 at this time.

Further, it is preferred that at least one of the back-surface elastic body 35 and the front-surface elastic body 36 be disposed along the entire circumference of the display panel 20 so as to prevent the impurities such as dust and droplets from penetrating into the backlight unit 80.

Figure 4:
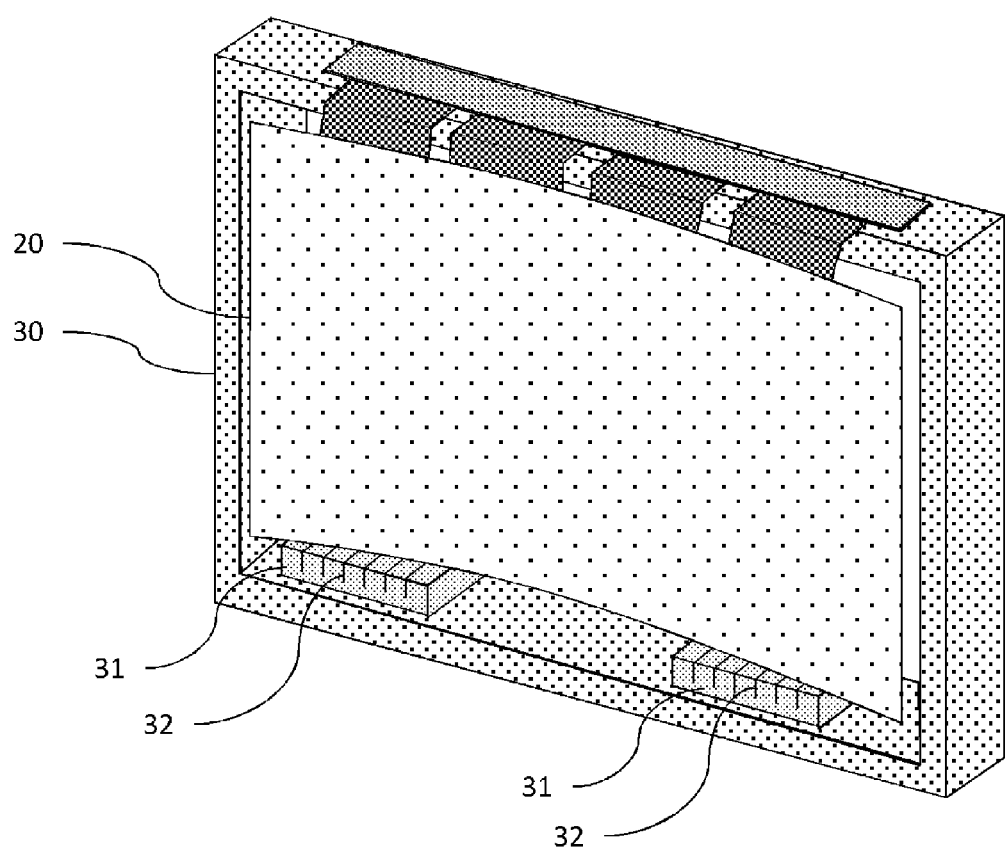
FIG. 4 is a perspective view of a backlight in a state in which the display panel of Embodiment 1 is warped.

FIG. 4 is a perspective view illustrating schematically the backlight in a state in which the display panel of Embodiment 1 of the present invention is warped. The frame 10 is not shown in FIG. 4. FIG. 4 depicts a state in which the display panel 20 is warped such that the display surface side is concaved.

FIGS. 5A and 5B illustrate schematically how the panel support member 31 according to Embodiment 1 of the present invention deforms according to the warping of the display panel 20. Here, a state is shown in which the display panel is warped such that the display surface side is concaved, in the same manner as in FIG. 4.

The panel support member 31 can be deformed by blocks partially divided and made partially independent from each other by a plurality of notches 32. In other words, the rigidity of the panel support member 31 in the warping direction of the display panel 20 is less than that when the notches 32 are absent. Thus, following the movement of the display panel 20 relative to the panel holder 30 which is caused by the deformation of the display panel, part of the panel support member 31 also moves relative to the panel holder 30, thereby deforming the panel support member 31. Therefore, when the display panel 20 is caught on the panel support member 31 by the burr 20c located on the lower side of the display panel 20, the panel support member 31 easily follows the warping of the display panel 20. As a result, the stresses occurring in the display panel 20 when the display panel 20 warps in a state in which the display panel 20 is caught by the panel support member 31 can be reduced and the display unevenness can be also reduced.

The warping amount of the display panel increases as the end portion of the display panel 20 is approached. Therefore, the deformation amount of the panel support member 31 observed when the display panel 20 warps decreases as the position of the panel support member 31 approaches the center of the display panel 20. In order to hold the display panel 20 stably, it is desirable that the panel support member 31 be disposed at a sufficient distance therefrom.

The panel support member 31 may be provided not only at the lower side of the display panel 20, but also at any surrounding side. A plurality of panel support members may be provided at each side.

The panel support member 31, the back-surface elastic body 35, and the front-surface elastic body 36 may be fixed not only with the two-side tape 33, but also with an adhesive or by fusing.

FIGS. 6A and 6B depict an example of shape variation of the panel holding member according to Embodiment 1 of the present invention. The panel support member 31a is provided with a plurality of notches 32a. The notches 32a are provided in the direction perpendicular to the surface of the panel support member 31a that supports the display panel 20 and also in the direction at an angle of about 45 degrees with respect to the display surface of the display panel 20. Where the display panel 20 warps in a certain direction, the rigidity of the panel support member 31a in the warping direction of the display panel 20 can be further reduced by inclining the notches 32a with respect to the warping direction of the display panel 20. The inclination angle is not limited to 45 degrees.

Embodiment 2

Embodiment 2 of the present invention will be explained hereinbelow with reference to the drawings.

Figure 7:
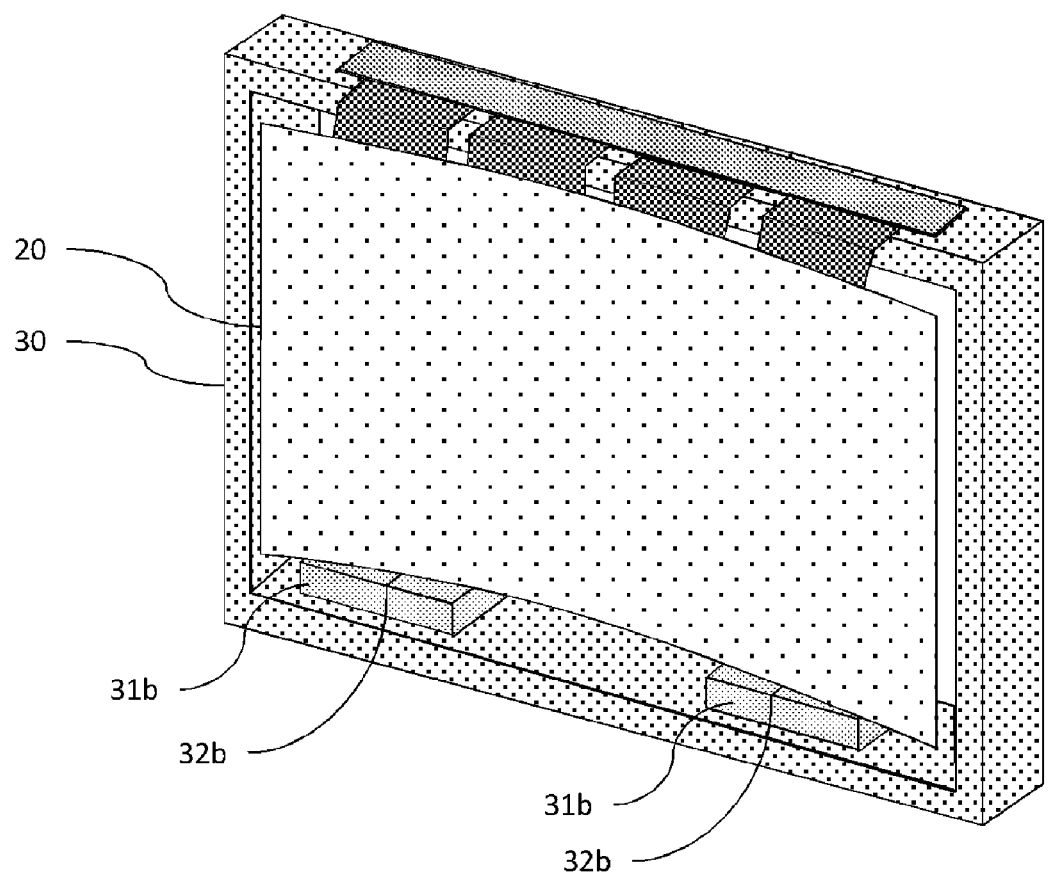
FIG. 7 is a perspective view of a backlight in a state in which the display panel of Embodiment 2 is warped.

FIG. 7 is a perspective view illustrating schematically the backlight in a state in which the display panel according to Embodiment 2 of the present invention is warped. The frame 10 is not shown in FIG. 7. In the state depicted in FIG. 7, the display panel 20 is warped such that the display surface side is concaved.

Figure 8:
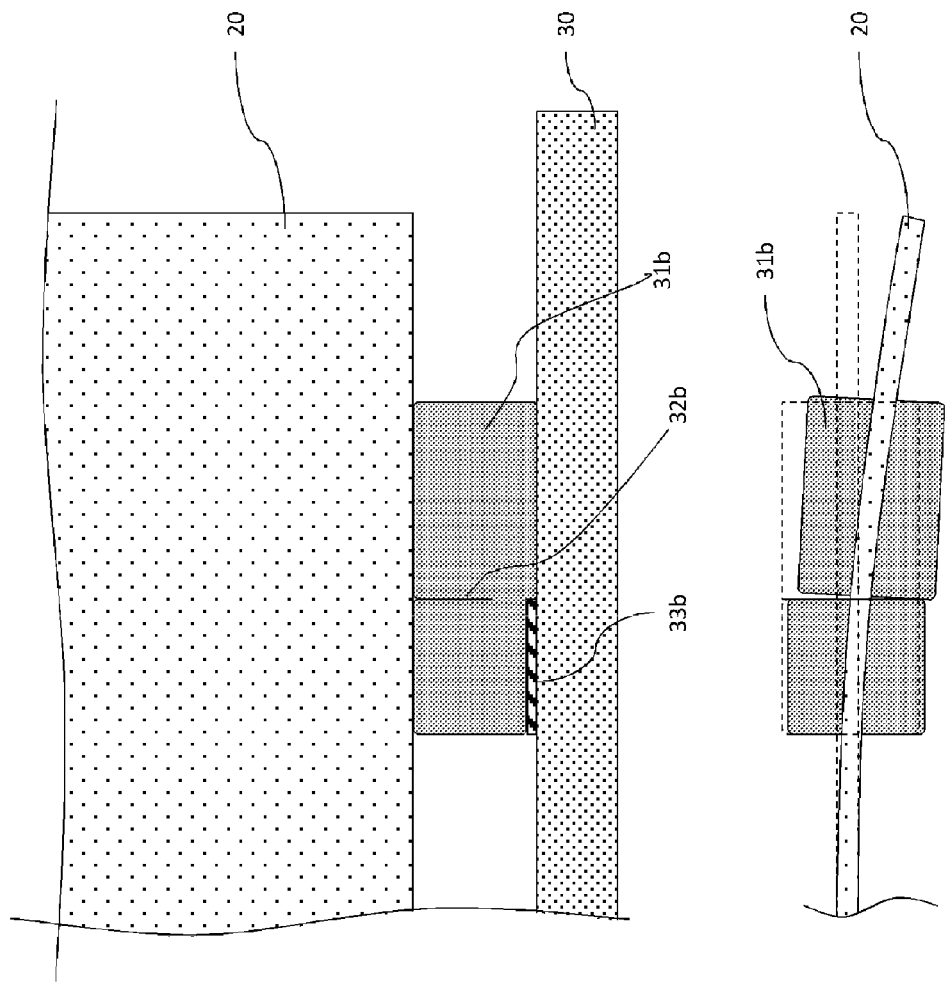
FIGS. 8A and 8B illustrate a state in which the panel holding member of Embodiment 2 follows the warping of the display panel.

FIGS. 8A and 8B illustrates schematically how the panel support member 31b according to Embodiment 2 of the present invention follows the warping of the display panel 20. The case in which the display panel 20 is warped such as to be concaved on the display surface side is shown by way of example, in the same manner as in FIG. 7.

A notch 32b is provided in the panel support member 31b. The notch 32b is provided in the direction perpendicular to the surface of the panel support member 31b that supports the display panel 20 and also in the direction perpendicular to the display surface of the display panel 20.

The panel support member 31b is fixed to the panel holder 30 by only one block partially divided by the notch 32b at the surface on the side opposite that in contact with the display panel 20. A two-side tape 33b is used for fixing.

The other partially divided block of the panel support member 31b is not fixed to the panel holder 30. Therefore, the rigidity of the panel support member 31b in the warping direction of the display panel 20 is less than that in the case in which the notch 32b is not present and also less than that in the case in which the notch 32b is present, but each block is fixed to the panel holder 30. Therefore, where the burr 20c located on the lower side of the display panel 20 is caught by the panel support member 31, the panel support member 31b easily follows the warping of the display panel 20, as shown in FIGS. 8A and 8B. As a result, the stresses occurring in the display panel 20 when the display panel 20 warps in a state in which the display panel 20 is caught by the panel support member 31b can be reduced and the display unevenness can be also reduced.

The warping amount of the display panel 20 increases as the end portion of the display panel is approached. Therefore, it is preferred that the panel support member 31b be fixed with the two-side tape 33b at the side close to the center of the display panel 20.

Figure 9:
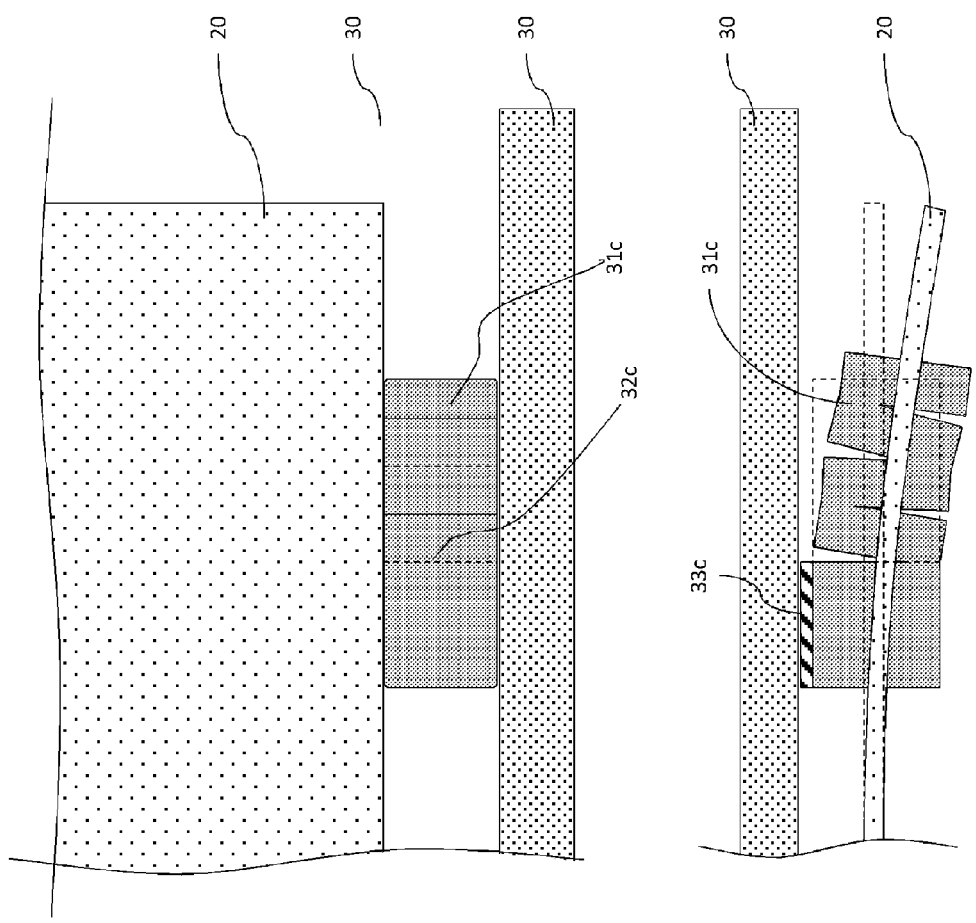
FIGS. 9A and 9B depict an example of shape variation of the panel holding member of Embodiment 2.

FIGS. 9A and 9B illustrate schematically an example of shape variation of the panel holding member according to Embodiment 2 of the present invention. A plurality of notches 32c is provided in the panel support member 31c. The notches 32c are provided alternately from the display surface side and back surface side in the direction perpendicular to the surface of the panel support member 31c that supports the display panel 20 and also in the direction perpendicular to the display surface of the display panel 20.

Some of the blocks of the panel support member 31c partially divided by the notches 32c are fixed to the panel holder 30 with a two-side tape 33c attached to the surface parallel to the display surface of the display panel 20. Other partially divided blocks of the panel support member 31c are not fixed to the panel holder 30 and are divided by the plurality of notches 32c. Therefore, the panel support member 31c has a small rigidity in the warping direction of the display panel 20 and follows the warping of the display panel 20. As a result, the stresses occurring in the display panel 20 when the display panel 20 warps in a state in which the display panel 20 is caught by the panel support member 31 can be reduced and the display unevenness can be also reduced.

Embodiment 3

Figure 10:
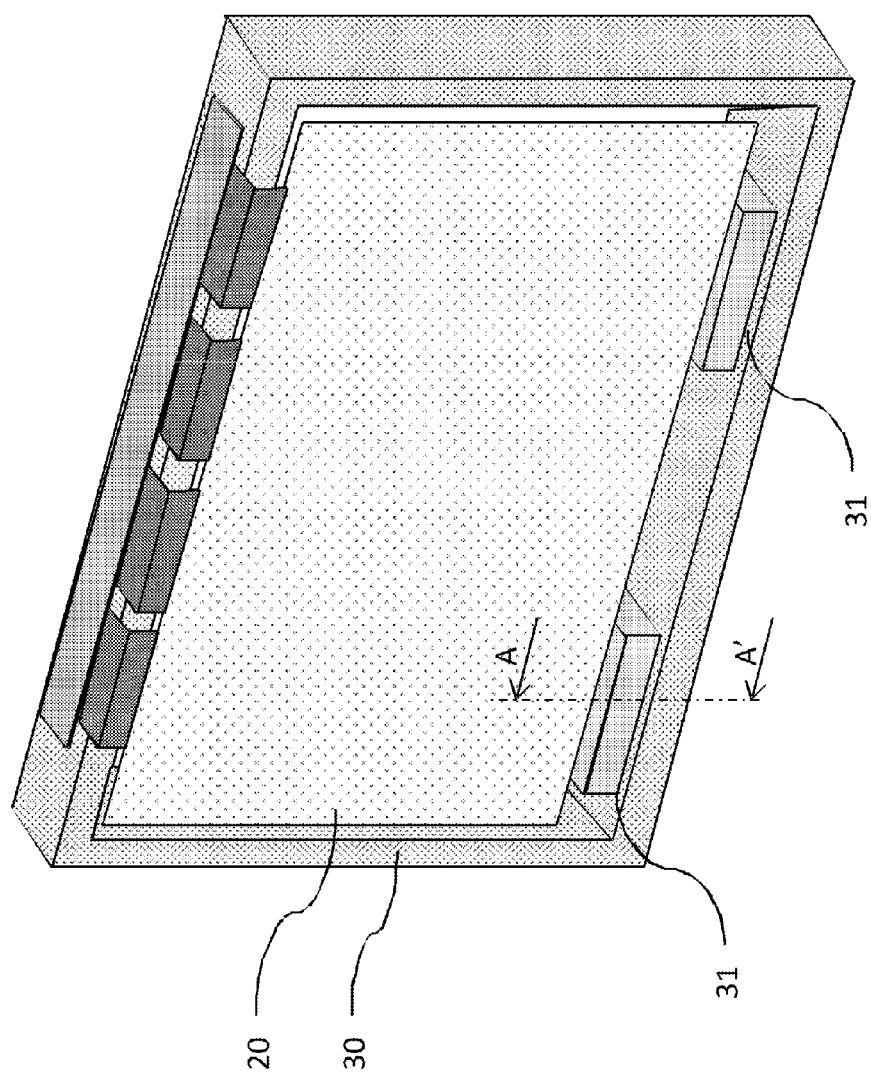
FIG. 10 illustrates a state in which the display panel of Embodiment 3 is incorporated in a backlight unit.

FIG. 10 is a perspective view illustrating schematically a state in which the display panel according to Embodiment 3 of the present invention is incorporated in a backlight unit. However, the frame 10 is not shown in FIG. 10. The cross-sectional view taken along A-A' in FIG. 10 is the same as in FIG. 3. The difference between the configuration depicted in FIG. 10 and that depicted in FIG. 2 is that the panel support member 31 is not provided with the notches 32. Other basic features are the same as illustrated by FIGS. 1 and 3.

Figure 11:
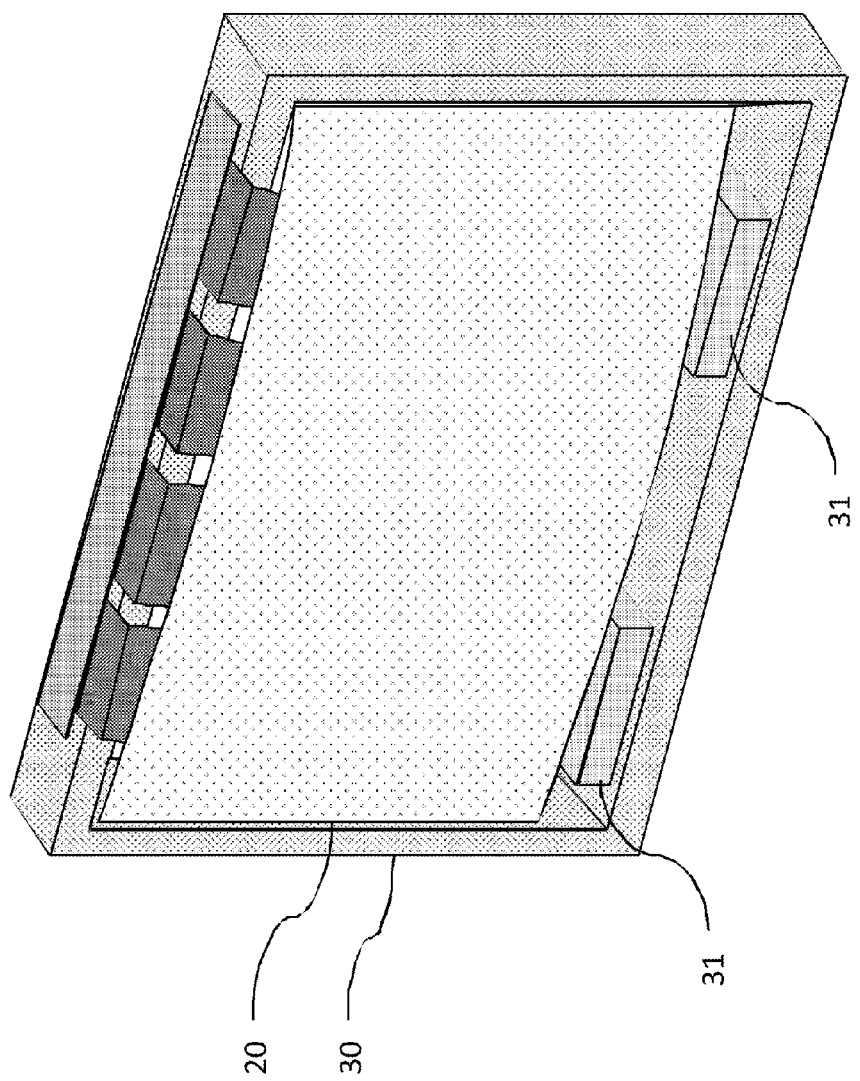
FIG. 11 is a perspective view of a backlight in a state in which the display panel of Embodiment 3 is warped.

FIG. 11 is a perspective view illustrating schematically a backlight in a state in which the display panel of Embodiment 3 is warped. The frame 10 is not shown in FIG. 11. FIG. 11 depicts a state in which the display panel 20 is warped such that the display surface side thereof is convexed.

Figures 12A, 12B:
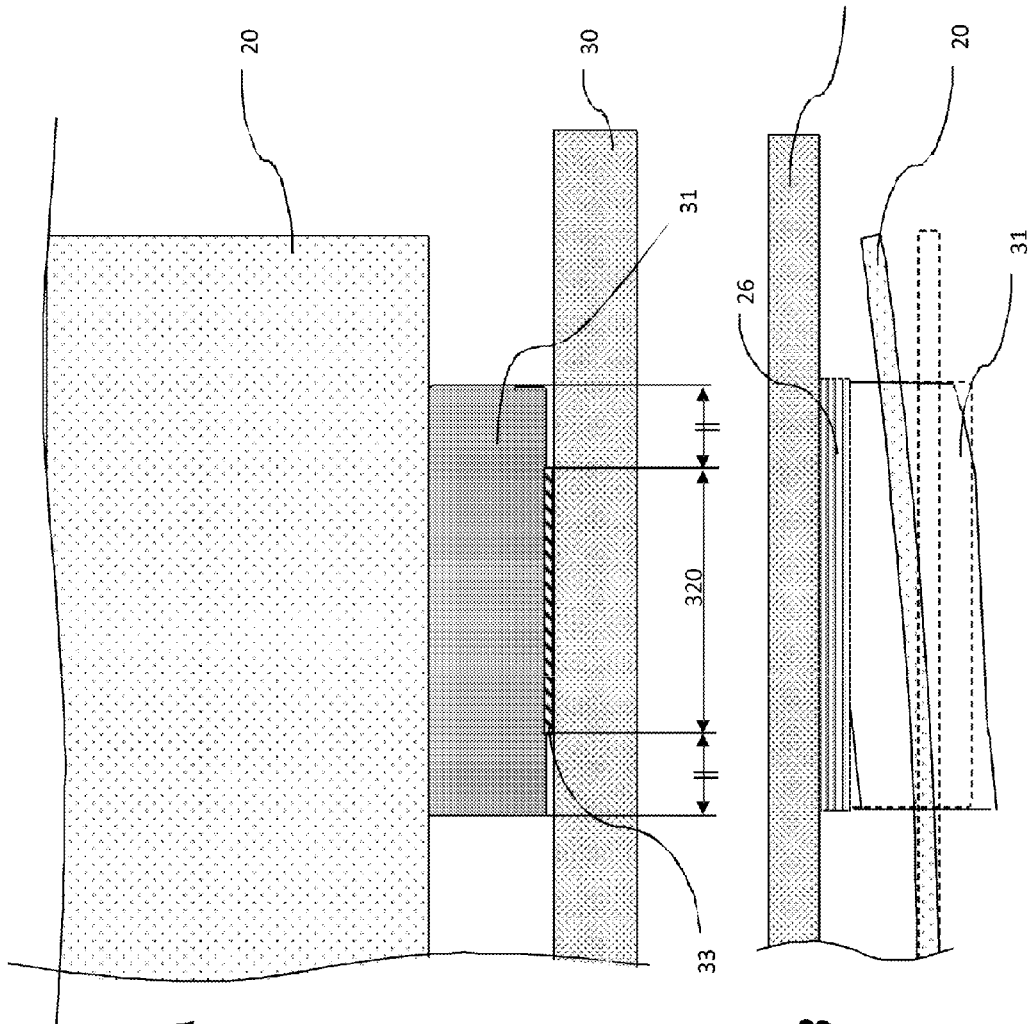
FIGS. 12A and 12B illustrate states in which the panel holding member of Embodiment 3 follows the warping of the display panel.

FIG. 12 illustrates schematically how the panel support member 31 according to Embodiment 3 of the present invention follows the warping of the display panel 20. FIG. 12A is a view taken from the display surface side of the display panel 20. FIG. 12B is a view taken from above the display panel 20. In the example shown herein, the display panel 20 is warped such as to be convex at the display surface side, in the same manner as in FIG. 11.

The panel support member 31 is fixed with a two-side tape 33 such that a back-surface space is ensured between the panel support member 31 and the panel holder 30. The range of the panel support member 31 which is bonded by the two-side tape 33 to the panel holder 30 is called a fixed portion 320. The length of the two-side tape 33 (length along the horizontal direction of the surface of the display panel 20) is about ⅓ to ⅝ of the length of the panel support member 31 (length along the horizontal direction of the surface of the display panel 20). The two-side tape 33 is fixed to the central portion of the bottom surface of the panel support member 31. Since the two end portions of the panel support member 31 are not fixed by the two-side tape 33, they can be bent (deformed) to match the warping of the display panel 20. In other words, the rigidity of the panel support member 31 in the warping direction of the display panel 20 is less than that in the case in which the panel support member 31 is fixed over the entire bottom surface to the panel holder 30. Further, the size of the two-side tape 33 in the bottom surface portion of the panel support member 31 is not limited thereto, provided that the panel support member 31 can be deformed and bent inside the front-surface space and back-surface space 26 provided in front of and behind the panel support member 31. A structure may be also used in which the entire surface of the bottom surface portion or an area close to the entire surface is fixed with the two-side tape, provided that the panel support member can be deformed following the warping direction of the display panel 20.

The panel support member 31 can bend following the warping of the display panel 20 as a result of providing the front-surface space 25 and the back-surface space 26 in addition to reducing the fixing range of the bottom surface portion as described hereinabove. Therefore, where the display panel 20 is caught on the panel support member 31 by the burr 20c located on the upper side of the display panel 20, the panel support member is easily deformed following the warping of the display panel 20.

As a result, the stresses occurring in the display panel 20 when the display panel 20 warps in a state of being caught by the panel support member can be reduced and the display unevenness can be also reduced.

Embodiment 4

Embodiment 4 of the present invention is explained below with reference to the appended drawings.

FIG. 13 is a perspective view illustrating schematically a backlight in a state in which the display panel of Embodiment 4 of the present invention is warped. FIG. 13A is a view taken from the display surface side of the display panel 20, and FIG. 13B is a view of the display panel 20 taken from above. The frame 10 is not shown in FIG. 13. FIG. 13 shows a state in which the display panel 20 is warped to be convexed on the display surface side.

In the configuration of Embodiment 3, where the space in which the panel support member 31 moves to the back surface side or front surface side and bends is eliminated due to an error during bonding or degradation with the passage of time, the panel support member 31 cannot bend following the warping of the panel, thereby causing the display unevenness. Accordingly, the structure of Embodiment 4 is different from that of Embodiment 3 in that the space in which the panel support member 31 can reliably bend can be maintained.

A rib 27 is disposed in the gap between the panel holder 30 and the panel support member 31. As for the thickness of the rib 27, the distal end thereof is rounded in the same manner as the back-surface space 26. The rib 27 may be an independent part, or may be obtained by processing of rib formation in use of molding for the panel holder 30. The panel support member 31 is disposed in contact with the rib 27. The rib is disposed such that the center of the rib 27 is at the same position as the end surface (end portion of the display panel 20 in the horizontal direction of the surface) of the fixed portion 320. As a result, when the display panel 20 is warped, the panel support member 31 easily bends according to the warping of the display panel 20 about the rib 27 as a fulcrum.

Further, because of the rib 27, an appropriate space corresponding to the size of the rib 27 is maintained in the back-surface space 26 provided between the panel support member 31 and the panel holder 30. In this example, the rib 27 is disposed in the back-surface space 26, but the rib 27 may be also disposed in the front-surface space 25, or both in the front-surface space 25 and the back-surface space 26.

According to Embodiment 4, the rib 27 can more reliably ensure the front-surface space 25 and the back-surface space 26 where the panel support member 31 can bend, and the panel support member 31 easily bends about the rib 27 as a fulcrum. As a result, the panel support member 31 can easily deform according to the warping of the display panel 20, stresses occurring in the display panel 20 when the display panel 20 warps can be reduced and the display unevenness can be also reduced.

Embodiment 5

Embodiment 5 of the present invention is explained below with reference to the drawings.

The specific feature of Embodiment 5 is that in the configurations of the above-described Embodiment 3 and Embodiment 4, the structure of the panel support member 31 is also provided in the lateral direction of the display panel 20.

Figure 14:
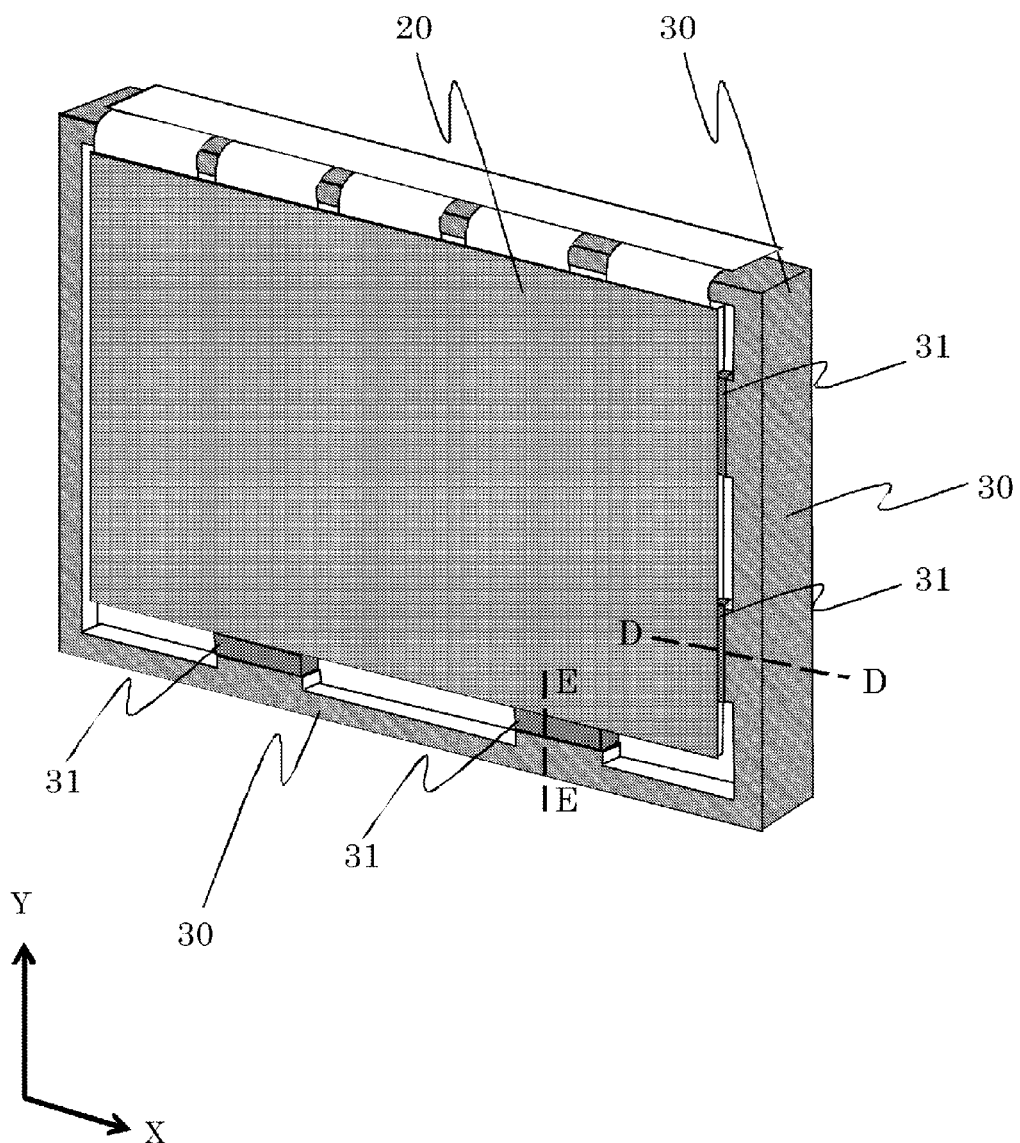
FIG. 14 is a perspective view of the holding structure of the display panel of Embodiment 5.

FIG. 14 is a perspective view of the holding structure of the display panel 20 of Embodiment 5 of the present invention.

The display panel 20 is warped at the four corners thereof when the usage environment of the display panel 20, or ambient temperature and humidity change. With the configurations of the above-described Embodiment 1 and Embodiment 4, in the longitudinal direction which becomes the bottom surface side (lower side) of the display panel 20, the panel support member 31 can bend following the longitudinal warping of the display panel 20, but no similar effect can be obtained when lateral warping occurs. Accordingly, a structure similar to that shown in the cross section E-E in FIG. 3 is provided in the lateral direction, and the structure depicted in FIG. 3 is obtained. This structure is similar to that depicted in FIGS. 12A and 13A, when the display panel 20 is viewed from the display surface side, and similar to that depicted in FIGS. 12B and 13B when the display panel 20 is viewed in the horizontal direction (X direction) along the display surface from the left to the right in FIG. 14. In FIG. 14, the longitudinal direction of the display panel 20 is taken as the X direction, and the lateral direction is taken as the Y direction.

Figure 15A:
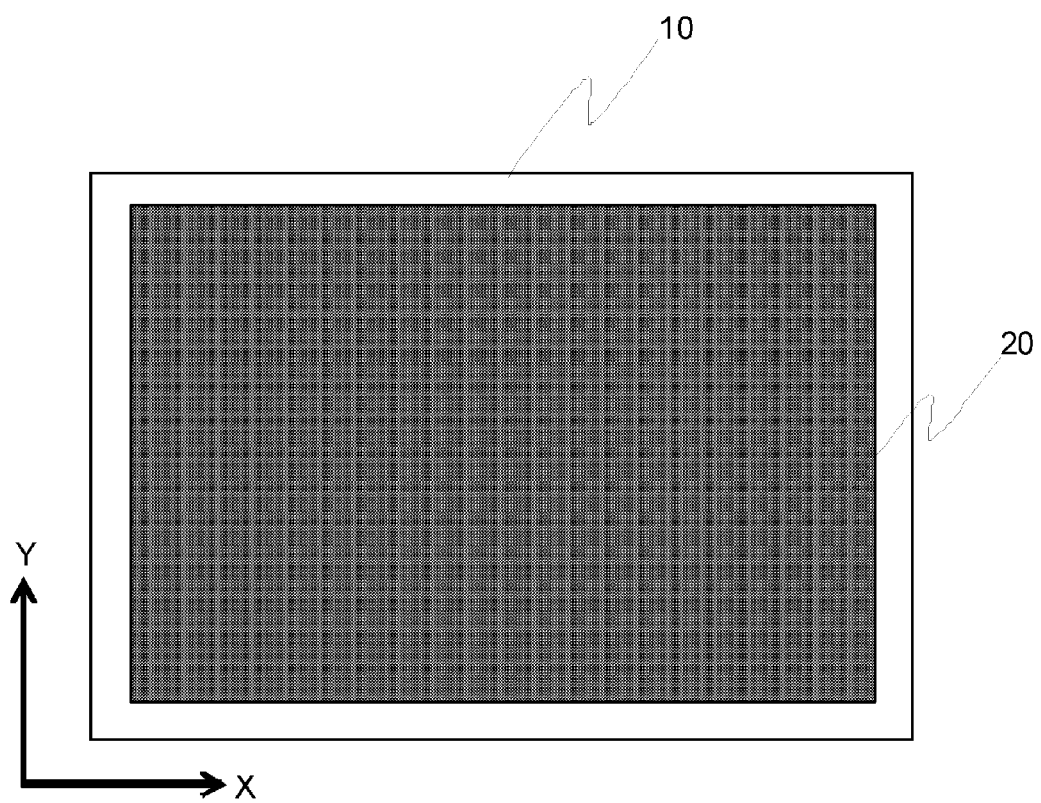
FIG. 15A and 15B are front views of the image display device of Embodiment 5.
Figure 15B:
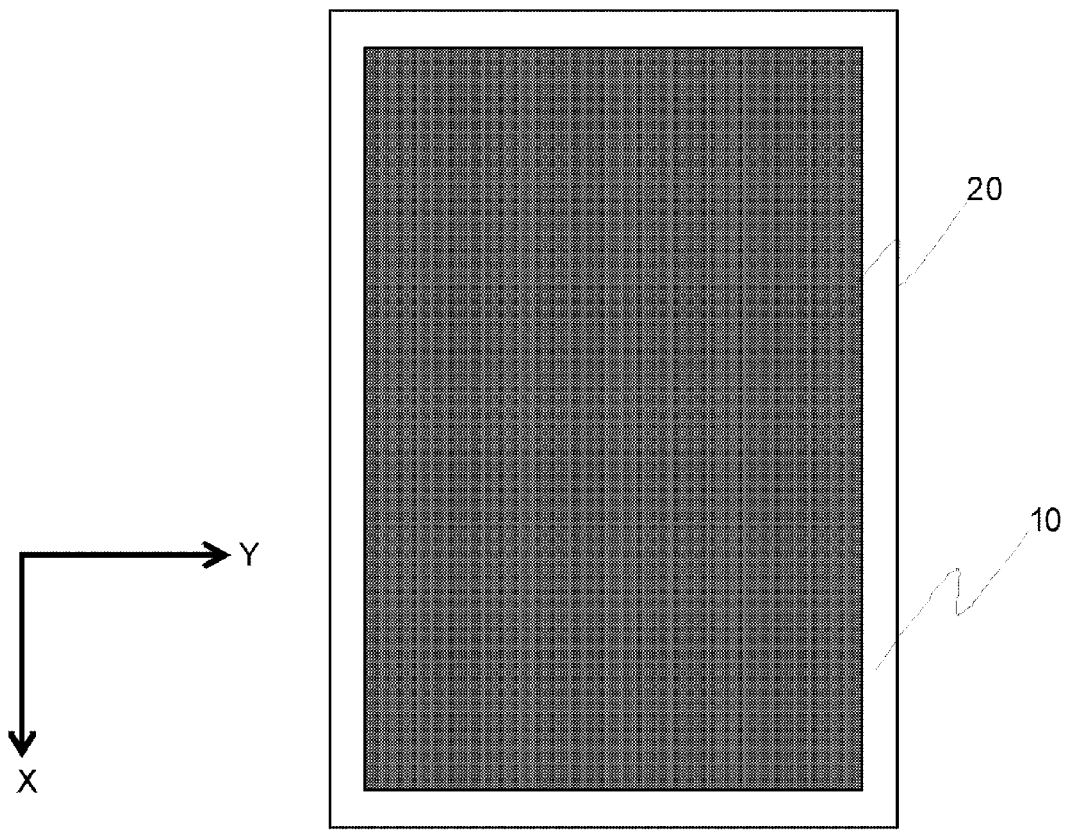
Figure 16:
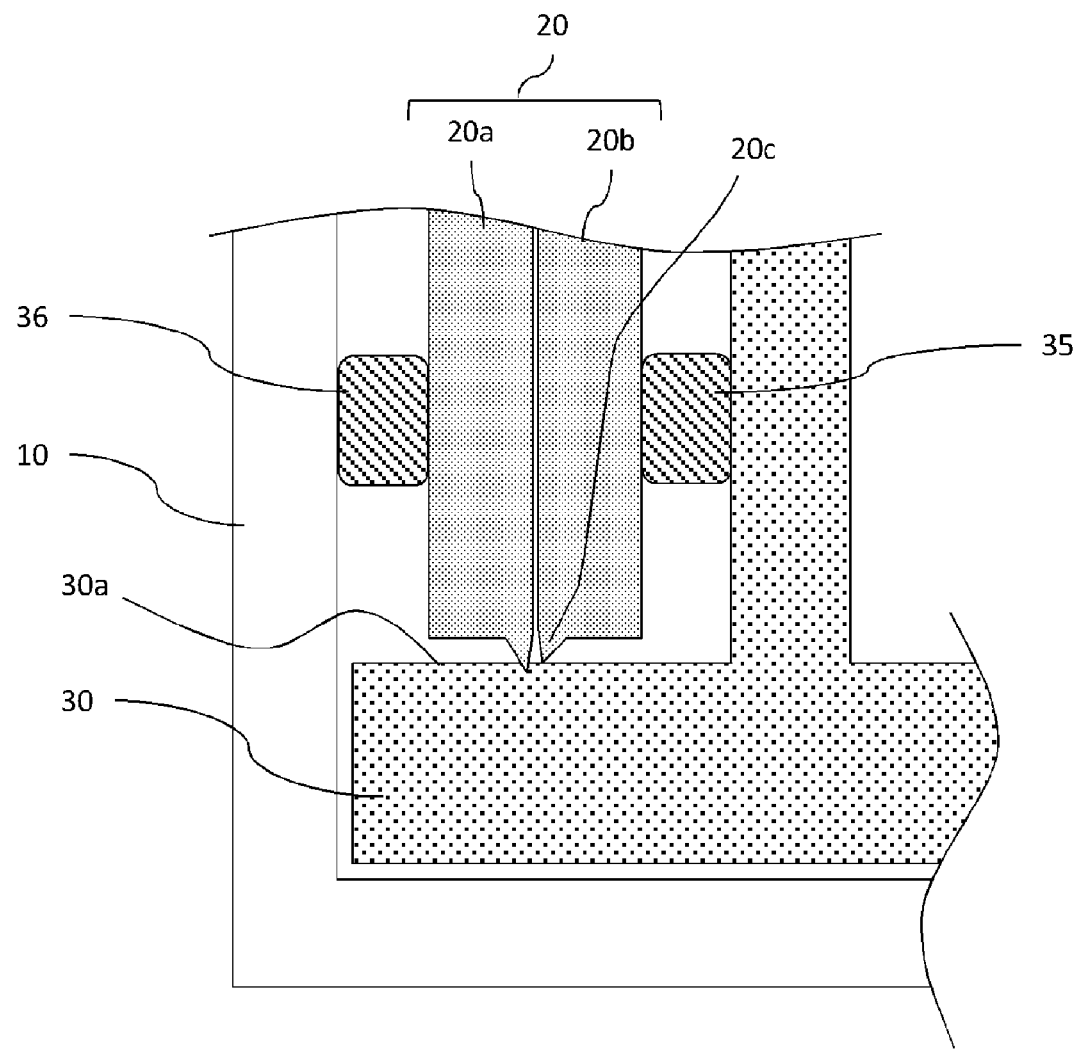
FIG. 16 is an enlarged view illustrating a panel holding member of the display panel in the conventional image display device.

FIGS. 15A and 15B are front views of the image display device according to Embodiment 5 of the present invention.

In FIG. 15A, the image display device is arranged such that the lateral direction (Y direction) is vertical and the longitudinal direction (X direction) is horizontal. In this case, the direction of the force of gravity is the -Y direction. The image display device is used in this way, for example, when observing an image with a picture field in a landscape orientation such as 16:9. Depending on the image, the image display device is sometimes used in portrait orientation. The image display device has a pivot function that makes it possible to rotate the screen about an axis perpendicular to the screen. FIG. 15B illustrates the arrangement obtained by using the pivot function such that the lateral direction (Y direction) of the image display device is horizontal and the longitudinal direction (X direction) is vertical. In this case, the force of gravity is along the X direction.

When the image display device is used in a landscape orientation, the weight of the display panel 20 is applied in the -Y direction shown in FIG. 14. Therefore, the panel support member 31 of longitudinal orientation is disposed at the lower side of the display panel 20, as shown in FIG. 14, to receive this weight. Where the image display device is rotated clockwise, as shown in FIG. 14, by the pivotal rotation and used in a portrait orientation, the weight of the display panel 20 is applied in the X direction in FIG. 14. Therefore, the panel support member 31 of lateral orientation is disposed at the right side of the display panel 20, as shown in FIG. 14, to receive this weight.

With the configuration of Embodiment 5, the display unevenness can be inhibited in both the landscape and portrait orientations of the pivotally rotatable image display device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-012434, filed on Jan. 27, 2014, which is hereby incorporated by reference herein in its entirety.

What is claimed is:

1. A display device comprising:
a display panel;
a support member that is in contact with at least a part of a lower side of the display panel; and
a panel holder that has a first member supporting via the support member the lower side of the display panel, wherein
the support member is an elastic body that, in a case where the display panel is deformed, the elastic body deforms accordingly as a result of a part thereof moving relative to the first member.

2. The display device according to claim 1, wherein at least one notch, which is perpendicular to a support member surface that is in contact with the display panel and which is formed from the surface that is in contact with the display panel to a position that does not reach a surface that is in contact with the first member, is provided in the support member.

3. The display device according to claim 1, wherein notches, which are perpendicular to a support member surface that is in contact with the display panel and which are formed from one surface parallel to a display surface of the display panel to a position that does not reach the other surface, and notches, which are perpendicular to a support member surface that is in contact with the display panel and which are formed from the other surface parallel to the display surface of the display panel to a position that does not reach the one surface, are provided alternately in the support member.

4. The display device according to claim 2, wherein the surface where the notch is formed is perpendicular to the display surface of the display panel.

5. The display device according to claim 2, wherein the surface where the notch is formed is at an oblique angle with respect to the display surface of the display panel.

6. The display device according to claim 2, wherein the support member is fixed to the first member by a surface which is a part of the surface that is in contact with the first member, and a portion of the support member, in which the surface that is in contact with the first member is not fixed to the first member, moves relative to the first member, thereby deforming the support member.

7. The display device according to claim 6, wherein the part of the surface is a surface of one or some portions of the support member from among a plurality of portions divided by the notches.

8. The display device according to claim 7, wherein the one or some portions are portions closer to a center of the display panel from among the plurality of portions.

9. The display device according to claim 1, wherein
the panel holder further includes a second member that supports via an elastic member the display surface of the display panel, and a third member that supports via an elastic member the back surface of the display panel; and
the support member is fixed to the first member by a surface which is a part of the surface that is in contact with the first member, and a portion of the support member, in which the surface that is in contact with the first member is not fixed to the first member, moves relative to the first member, thereby deforming the support member.

10. The display device according to claim 9, wherein
the support member is deformed in a space between the support member and the second member and in a space between the support member and the third member.

11. The display device according to claim 9, wherein
the second member has a rib ensuring a predetermined space between the support member and the second member.

12. The display device according to claim 9, wherein
the third member has a rib ensuring a predetermined space between the support member and the third member.

13. The display device according to claim 1, wherein
a plurality of support members is provided.

14. The display device according to claim 1, wherein
the display device can rotate about an axis perpendicular to a display surface of the display panel;
there are a plurality of sides of the display panel that can serve as a lower side as a result of rotation when the display device is used; and
the support member is provided at a plurality of sides that can serve as a lower side.

* * * * *